March 26, 1968　　　A. J. SAUNDERS　　　3,374,711
POWER DRAWBAR
Filed Feb. 24, 1966
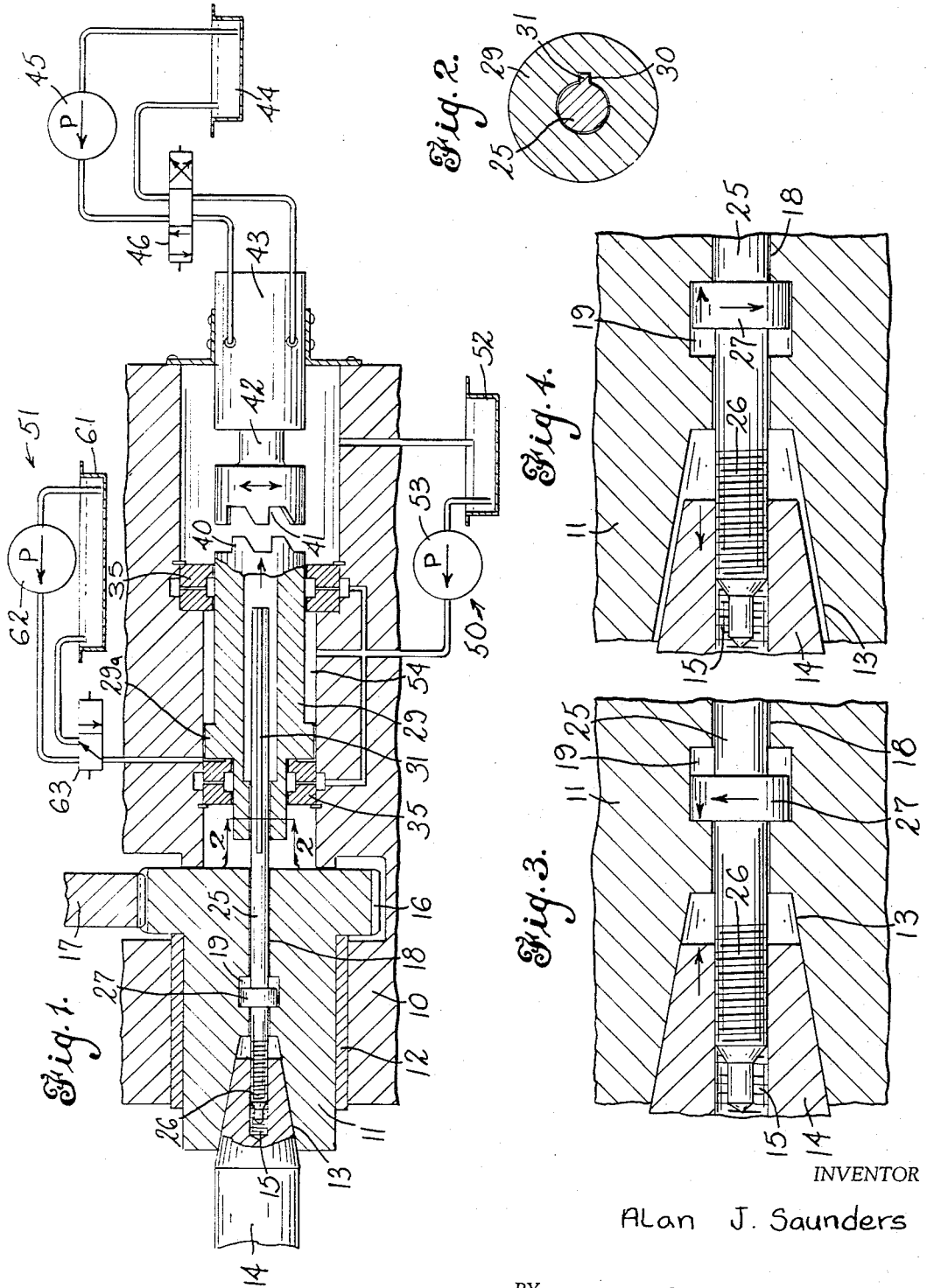
INVENTOR
Alan J. Saunders
BY
De Lio and Montgomery
ATTORNEYS 3,374,711
POWER DRAWBAR
Alan J. Saunders, Manchester, Conn., assignor to Pratt & Whitney Inc., West Hartford, Conn.
Filed Feb. 24, 1966, Ser. No. 529,787
10 Claims. (Cl. 90—11)

This invention relates to machine tools and more particularly means for locking and unlocking a tool within a tool holder of a machine tool.

This invention has particular utility for locking and unlocking an arbor in a milling machine and locking a tool in a lathe chuck or in a lathe collet. This invention provides means for insuring that a tool is securely held in place within a spindle and, further, provides means for automatically releasing the tool after the work has been machined. This invention also provides means for accomplishing the locking and unlocking and holding the tool in place without restricting the rotary motion of the tool to accomplish the machining operations.

In the past, tools were generally placed in a spindle by manual operation. This leaves much to be desired since the tool is not always securely held in place. Further, after machining has been accomplished, the tool is then difficult to remove.

Applicant has aleviated this problem by the invention of a new and improved power drawbar for accomplishing the locking and unlocking procedure without interfering with the rotation of the tool during machining of the work.

In view of the foregoing, it is an object of this invention to provide a new and improved means for locking and unlocking a tool within a tool holder.

Another object of this invention is to provide a new and improved means for insuring that a tool is securely held in place and then releasing the tool after the machining operation is completed.

A further object of the invention is to provide a new and improved power drawbar for locking a tool in place without interfering with the rotation of the tool during machining.

Still other objects and advantages of the invention will in part be obvious and will in part appear hereinafter.

The invention accordingly comprises the apparatus possessing the features, properties and relation of elements which will be exemplified in the apparatus hereinafter described and the scope of the invention will be indicated in the claims.

For a fuller understanding of the nature and objects of the invention, reference should be had to the following detailed description taken in conjunction with the accompanying drawing, in which the same reference numerals designate like corresponding parts of the several views, and in which FIG. 1 is a digrammatic view partially in section of a power drawbar according to the invention;

FIG. 2 is a sectional view taken along line 2—2 of FIG. 1;

FIG. 3 is a enlarged section of a portion of FIG. 1; and

FIG. 4 is a view similar to FIG. 3 with said enlarged portion in a different position.

Referring to FIGS. 1 and 2, there is shown a housing 10 in which there is positioned for rotation a spindle 11 which is mounted for rotation on a friction bearing shown at 12. The spindle 11 includes a preferably conical cut-out portion 13 in which a tool 14 having a threaded bore 15 may be positioned. The spindle 11 also includes gear teeth 16 which mesh with a driving gear 17 provided for rotating the spindle and the tool. The spindle is also provided with a bore 18 and an enlarged cut-out way 19 intermediate the two ends of bore 18.

There is shown positioned in bore 18 and the way 19, a drawbar 25 having a threaded portion 26 for engaging the threads of threaded bore 15 of the tool 14. The drawbar 25 includes a flanged portion 27 which is positioned in the way 19 such that the drawbar 25 may move to the left or the right of the drawing for a short distance within the way 19. The other end of drawbar 25 is positioned in torque tube 29 having a way 30. The drawbar 25 is provided with a spindle 31 which is positioned in the way 30 such that the drawer may slide axially but is prevented from rotating by the way acting against the spindle 31.

The torque tube 29 is supported by hydrostatic bearings 35 for rotation with the spindle. It is also provided with teeth 40 having an angled slope other than 90° on one side thereof. These teeth form a jawtooth cluch arrangement with mating grooves 41 positioned on a shaft 42 of a hydraulic motor 43. The motor 43 is driven from a fluid reservoir 44, a pump 45 and through a solenoid-actuated valve 46 such that the inner housing may be driven in a forward or reverse direction.

In order to position the torque tube 29 such that it may engage and be withdrawn from the grooves 41, there are provided two hydraulic systems shown at 50 and 51, respectively. The hydraulic system 50 includes a reservoir 52 and a pump 53 with an over-pressure relief valve. The hydraulic system 50 provides fluid under pressure to the hydrostatic bearings 35 and into a cavity 54 formed between the housing 10 and a flange 29a formed on the torque tube 29. When the fluid is pumped into cavity 54 the tube 29 will be driven to the left of the drawing and away from the grooves 41. In order to force the torque tube 29 to the right of the drawing so that it may engage the grooves 41, the hydraulic system 51 is provided with a reservoir 61, a pump 62 and a solenoid valve 63 for permitting fluid to enter or exit from the opposite side of the flange 29a away from cavity 54. The hydraulic fluid is forced in from the hydraulic system 51 by positioning the valve 63 to the left of the drawing. The tube 29 will then be driven toward the right of the drawing to engage the grooves 41. Although fluid pressure is being simultaneously supplied into cavity 54 from pump 53, the fluid from hydraulic system 51 is at a greater pressure so that it may force the tube 29 toward the right of the drawing. When this occurs there is a build-up of a back pressure in the line of hydraulic system 50 and thus the relief valve in the pump 53 becomes operative to release this additional pressure. To reposition the tube 29 toward the left of the drawing, the solenoid valve 63 is moved toward the right of the drawing so that fluid may escape from one side of flange 29a to permit fluid from pump 53 to force the torque tube 29 to move to the left of the drawing.

Thus, in operation, the tool 14 is positioned within the tapered bore 15 of the spindle such that it engages the threaded portion of the drawbar. The valve 46 and valve 63 are then actuated to force the torque tube 29 toward the right, such that the teeth 40 engage grooves 41. The hydraulic motor 43 is then actuated to rotate the drawbar to securely clamp tool 14 within the tapered portion 13 of the spindle. When the tool 14 is in the locked position, the jawtooth clutch will begin to slip due to the tapered portion of teeth 40 and the mating grooves sliding past each other. This then indicates that the tool has been securely locked within the spindle. The valve 46 is then moved to a neutral position to stop motor 43 and, simultaneously, valve 63 will be reversed to permit the torque tube 29 to once again move to the left of the drawing. The spindle may then be rotated in the normal manner by the action of the gear drive 17. To unlock the tool the same procedure is followed, except that hydraulic motor 43 is reversed in direction.

In FIG. 3 there is shown the position of the drawbar 25 after it has locked tool 14 in place. As can be seen from this figure, the flange 27 abuts a shoulder of the way 19 to firmly lock the tool in place.

In FIG. 4 there is shown the position of the drawbar during the expelling of tool 14. It is to be noted that the drawbar flange 27 is positioned against a rear shoulder of the way 19 in order to force the tool out of the spindle.

Thus, there has been provided new and improved means for locking a tool in place and subsequently releasing the tool after the machining operation has been completed. The construction provided is such that, after the tool has been locked in place, the rotation of the tool and its driven spindle will not be interfered with.

It will thus be seen that the objects set forth above, among those made apparent from the preceding description, are efficiently attained and while certain changes may be made in the above construction without departing from the spirit and scope of the invention, it is intended that all matter contained in the foregoing description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A power drawbar apparatus, comprising a torque tube having a bore therein with a way formed within the bore, a drawbar having a portion thereof slidably mounted in the bore of the torque tube, said drawbar having a spline mounted for slidable axial movement in said way, and said drawbar having means thereon at one end thereof for engaging a tool.

2. An apparatus in accordance with claim 1, wherein said torque tube has a flange extending from the outer circumference thereof intermediate the ends of the tube, and including a housing having a bore therein surrounding said torque tube, the interior wall of said housing in slidable contact with the flange, a first bearing supported by said housing and positioned on one side of said flange to support said torque tube, a second bearing supported by said housing and positioned on the other side of said flange to support said torque tube, and means formed in said housing to permit fluid to be forced into the space between said flange and said bearings for movement of said torque tube in two axial directions.

3. An apparatus in accordance with claim 1, including a spindle having a cavity in one end thereof for receiving a tool, a bore in said spindle extending from said cavity to the other end of said spindle for receiving said drawbar, a way formed in said spindle between the ends of said spindle bore, and said drawbar including a flange extending therefrom, said flange positioned in said way for limited movement therein.

4. An apparatus in accordance with claim 1, wherein said torque tube includes gear teeth mounted on one end thereof, said teeth being saw-tooth shaped, and including a mating gear for driving said gear teeth, and means for driving said mating gear in two directions.

5. An apparatus in accordance with claim 2, wherein said drawbar is threaded at one end thereof.

6. An apparatus in accordance with claim 2, including means for selectively forcing fluid into said means formed in said housing for movement of said torque tube in two axial directions.

7. An apparatus in accordance with claim 2, wherein said bearings are hydrostatic bearings.

8. An apparatus in accordance with claim 2, wherein said bearings are hydrostatic and wherein means are provided in said housing for permitting fluid to be provided to said bearings.

9. An apparatus in accordance with claim 2, wherein said torque tube includes gear teeth mounted on one end thereof, said teeth being saw-tooth shaped, and including a mating gear for driving said gear teeth, means for driving said mating gear in two directions, wherein said bearings are hydrostatic bearings, wherein means are provided in said housing for permitting fluid to be provided to said housing, wherein said drawbar is threaded at one end thereof, and including a spindle having a cavity in one end thereof for receiving a tool, a bore in said spindle extending from said cavity to the other end of said spindle for receiving said drawbar, a way formed in said spindle between the ends of said spindle bore and said drawbar, including a flange extending therefrom, said flange positioned in said way for limited movement therein.

10. An apparatus in accordance with claim 9, including means for selectively forcing fluid into said means formed in said housing for moving said torque tube into and out of engagement with said mating gear.

References Cited
UNITED STATES PATENTS

| 2,667,819 | 2/1954 | De Vlieg | 90—11 |
| 2,924,152 | 2/1960 | Zettler | 90—11 |
| 3,038,386 | 6/1962 | Parske et al. | 90—11 |

GERALD A. DOST, *Primary Examiner.*